United States Patent [19]

Inuiya et al.

[11] Patent Number: 4,499,547
[45] Date of Patent: Feb. 12, 1985

[54] OUTPUT COMPENSATING SYSTEM

[75] Inventors: Masafumi Inuiya; Makoto Murakoshi, both of Asaka, Japan

[73] Assignee: Fuji Photo Optical Co., Ltd., Kanagawa, Japan

[21] Appl. No.: 292,400

[22] Filed: Aug. 13, 1981

[30] Foreign Application Priority Data

Aug. 19, 1980 [JP] Japan .................. 55-113765

[51] Int. Cl.$^3$ .............................................. H04N 5/21
[52] U.S. Cl. ...................................... 364/571; 358/213
[58] Field of Search ............... 364/571, 715, 765, 766; 340/347 CC; 358/213

[56] References Cited

U.S. PATENT DOCUMENTS

| | | | |
|---|---|---|---|
| 3,828,175 | 8/1974 | Amdahl et al. | 364/765 |
| 3,949,162 | 4/1976 | Malueg | 358/213 |
| 4,298,887 | 11/1981 | Rode | 358/213 |
| 4,303,984 | 12/1981 | Houvig | 364/571 |
| 4,317,134 | 2/1982 | Woo et al. | 358/213 |
| 4,323,977 | 4/1982 | Arseneau | 364/571 |

Primary Examiner—Gary Chin
Attorney, Agent, or Firm—Lucas & Just

[57] ABSTRACT

A system for compensating for variations in an output consisting of many components that show variations, comprising a memory for storing the compensation value for each component, an analog-to-digital converter for converting the output into several bits of digital output, a multiplier for multiplying the value of the high order bits of the digital output by the compensation value, and a subtracter for subtracting the output of the multiplier from the value of the low order bits. Instead of using the multiplier, the order of the value of the high order bits can be lowered down to that of the value of the low order bits, and the obtained value can be subtracted from the low order bits the number of times indicated by the compensation value.

2 Claims, 3 Drawing Figures

OUTPUT COMPENSATING SYSTEM

BACKGROUND OF THE INVENTION

1. Field of the Invention

This invention relates to a system for compensating for variations in an output, and more particularly to an output compensating system for compensating for variations in an output which consists essentially of a plurality of components showing variations proportional to the magnitude of inputs.

2. Description of the Prior Art

For example, in a solid state image pickup device comprising many light sensing elements, such as a CCD image sensor or an MOS image sensor, the light sensing elements exhibit somewhat non-uniform sensitivity due to variations in their light response characteristics, transfer efficiency, etc. Such non-uniformity in the sensitivity of the sensing elements results in an image sensor output comprising a plurality of components showing variations as mentioned above. Examples of the output voltages of a CCD line image sensor with reference to incident light having a uniform level of illumination are shown in the graph of FIG. 1. In this graph, the output voltage is plotted on the ordinate, and the positions of the light sensing elements on the abscissa. Variations in output voltage at any given level of incident light intensity indicated variations in sensitivity. It will also be noted that the magnitude of these variations differs with the level of the incident light intensity.

From an examination of the non-uniformity of the output voltages (variations in the sensitivity) shown in FIG. 1 for the light sensing elements, it is found that the width of fluctuation in the output voltage is approximately proportional to the level of the mean output voltage. It is also noted that the pattern of this fluctuation is constant regardless of the level of the mean output voltage. That is, the output voltage can be expressed by the following equation:

$$A(n) = \alpha(n) \cdot B(n) \quad n = 1, 2, \ldots, \quad (1)$$

in which $A(n)$ is the output voltage of the n-th light sensing element, $\alpha(n)$ is the output voltage regulation of said light sensing element, and $B(n)$ is the mean output voltage (ideal output voltage) of said light sensing element.

From Equation (1), it can be said that the non-uniformity of the output voltage of the solid state image pickup device (variation in the sensitivity) is a fixed pattern noise which is represented by a product with reference to the output voltage.

In image reading units using solid state image pickup devices, e.g. TV cameras, telecines and facsimile machines, the aforesaid variations in the sensitivity cause a fixed pattern noise superposed on the output voltage, bringing about an adverse effect.

As a method for eliminating the fixed pattern noise due to the sensitivity variations of the light sensing elements of such a solid state image pickup device, it is well known to store a fixed pattern for each light sensing element in a ROM (Read Only Memory). The signal of the corresponding fixed pattern noise value is read out synchronously with each component of the output signal of the solid state image pickup device. Then, the aforesaid output signal is divided by this read-out signal. In this method, the following calculation is made through a combination of the above-mentioned ROM and a divider circuit:

$$B(n) = A(n)/\alpha(n) \quad (2)$$

In order to carry out this method, however, it is necessary to use a ROM of a large capacity corresponding to the number of light sensing elements of the solid state image pickup device and to the required gradation levels, as well as a high-speed high-accuracy divider circuit. For example, when such a device has 1024 light sensing elements and 8 bits of gradation, the ROM must have a capacity as large as about 8 kilobits. Thus this method has not been put into practical use for economical reasons.

SUMMARY OF THE INVENTION

The object of the present invention is to provide a practical output compensating system of a simple construction.

When determining the probability distribution of the occurrence of $\alpha(n)$, the distribution involves a sufficiently small variance compared with the mean value. Accordingly, a normalized $\alpha(n)$ can be represented as follows:

$$\alpha(n) = 1 + \Delta\alpha(n) \quad |\Delta\alpha(n)| << 1 \quad (3)$$

As described above, compensation for the variations of each light sensing element is conducted by the following calculation:

$$B(n) = \frac{1}{\alpha(n)} \cdot A(n).$$

Substitution of Equation (3) into Equation (2) gives $$B(n) = \frac{1}{1 + \Delta\alpha(n)} \cdot A(n)$$

$$= A(n) - \frac{\Delta\alpha(n)}{1 + \Delta\alpha(n)} \cdot A(n)$$

where,
$$\Delta\alpha(n) << 1$$

Thus, $B(n)$ can be approximated by $$B(n) \approx A(n) - \Delta\alpha(n) \cdot A(n) \quad (4)$$

Therefore, it is possible to compensate for the sensitivity variations of each light sensing element by calculating Equation (4).

Basically, in compensating for the variations in the sensitivity of the light sensing elements according to the present invention, instead of the division based on Equation (2) as used in the conventional method, addition and subtraction are carried out based on Equation (4). Thus, the present invention simplifies the calculating circuit that is necessary for the compensation.

The output compensating system of the present invention comprises a memory means for storing the variation compensation value B (corresponding to $\Delta\alpha(n)$ mentioned above) of each component with reference to a given unit level of output, an analog-to-digital conversion means for converting said output into several bits of digital output, a multiplication means for multiplying the value A of the high order bits of said digital output by the compensation value B stored in the memory means, and a subtraction means for subtracting the output A×B of said multiplication means from the value C of the low order bits of said digital output. Instead of using the multiplication means, it is also possible to lower the order of the aforesaid value of the high order bits down to that of the aforesaid value of the low order bits, and subtract the value obtained from the low order bits the number of times indicated by the compensation value B.

DESCRIPTION OF THE PREFERRED EMBODIMENTS

Now the preferred embodiments of the output compensating system according to the present invention are described below with the reference to the drawings.

Figure 2:
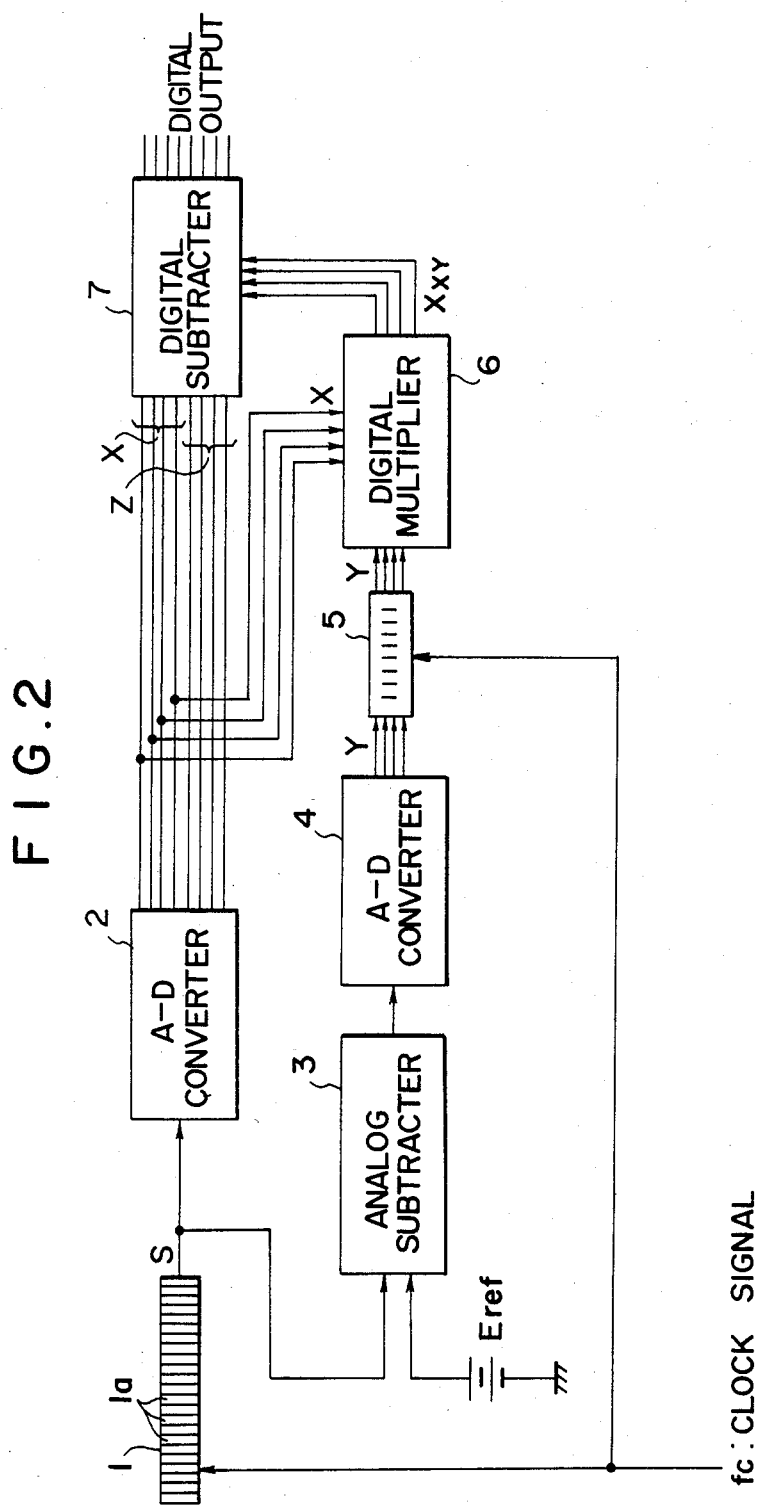
FIG. 2 is a block diagram showing an output compensating system according to the first embodiment of the present invention.

Referring to FIG. 2 showing a block diagram of the output compensating system of the first embodiment of the present invention, reference character 1 indicates a one-dimensional solid state image pickup device comprising a plurality of CCD sensors 1a. The output S of this device is input to a compensating system for compensating for the variations of components $S_1$, $S_2$, ... of the output S. The output terminal of the solid state image pickup device 1 is connected with the input terminal of an analog-to-digital converter 2 and with one input terminal of an analog subtracter 3 of the compensating system. The other input terminal of the subtracter 3 receives the ideal output voltage Eref which is a reference value for when the solid state image pickup device 1 is exposed to light of unit intensity. The analog subtracter 3 subtracts the voltage Eref from each of components $S_1$, $S_2$, ... of the output S of the solid state image pickup device. Each of outputs $\Delta E_1$, $\Delta E_2$, ... of the subtracter 3 is the signal ($\Delta\alpha(n)$) showing the variations of the component, i.e. the variations of the sensitivity of the corresponding light sensing element of the solid state image pickup device. The output terminal of the subtracter 3 is connected with the input terminal of an analog-to-digital converter 4. The analog-to-digital converter 4 receives the analog outputs $\Delta E_1$, $\Delta E_2$, ... from the subtracter 3 and converts them into the digital compensation values $Y_1$, $Y_2$, .... The output terminal of the analog-to-digital converter 4 is connected with the input terminal of a digital memory 5 such as ROM. The digital memory 5 stores the aforesaid compensation values $Y_1$, $Y_2$, ... synchronously with the reading clock signal $f_c$ for the solid state image pickup device. The output terminal of the memory 5 is connected with one input terminal of a digital multiplier 6. The other input terminal of the multiplier 6 receives the values $X_1$, $X_2$, ... of the high order bits of the output from the above-mentioned analog-to-digital converter 2. These values $X_1$, $X_2$, ... of the high order bits are multiplied by the compensation values $Y_1$, $Y_2$, ..., respectively, in the multiplier 6. Therefore, this multiplier 6 outputs $X_1 \times Y_1$, $X_2 \times Y_2$, .... The output terminal of the multiplier 6 leads to one input terminal of a digital subtracter 7, the other input terminal of which is connected with the output terminal of the analog-to-digital converter 2. The digital subtracter 7 subtracts the outputs $X_1 \times Y_1$, $X_2 \times Y_2$, ... of the aforesaid multiplier 6 from the values $Z_1$, $Z_2$, ... of the low order bits of the output from the analog-to-digital converter 2, respectively. That is, the compensating system of the present invention essentially calculates Equation (4), i.e.

$$B(n) = A(n) - \Delta\alpha(n) \cdot A(n)$$

with the use of the aforesaid multiplier 6 and the subtracter 7, thereby compensating for the variations in the components of the output from the solid state image pickup device.

The functions of the above-described output compensating system of the present invention will further be illustrated below with reference to the following non-limitative example.

A 2048-bit CCD line sensor was used as the solid state image pickup device 1, and the analog-to-digital converter 2 employed was of 8 bits and 256 gradation levels.

Figure 1:
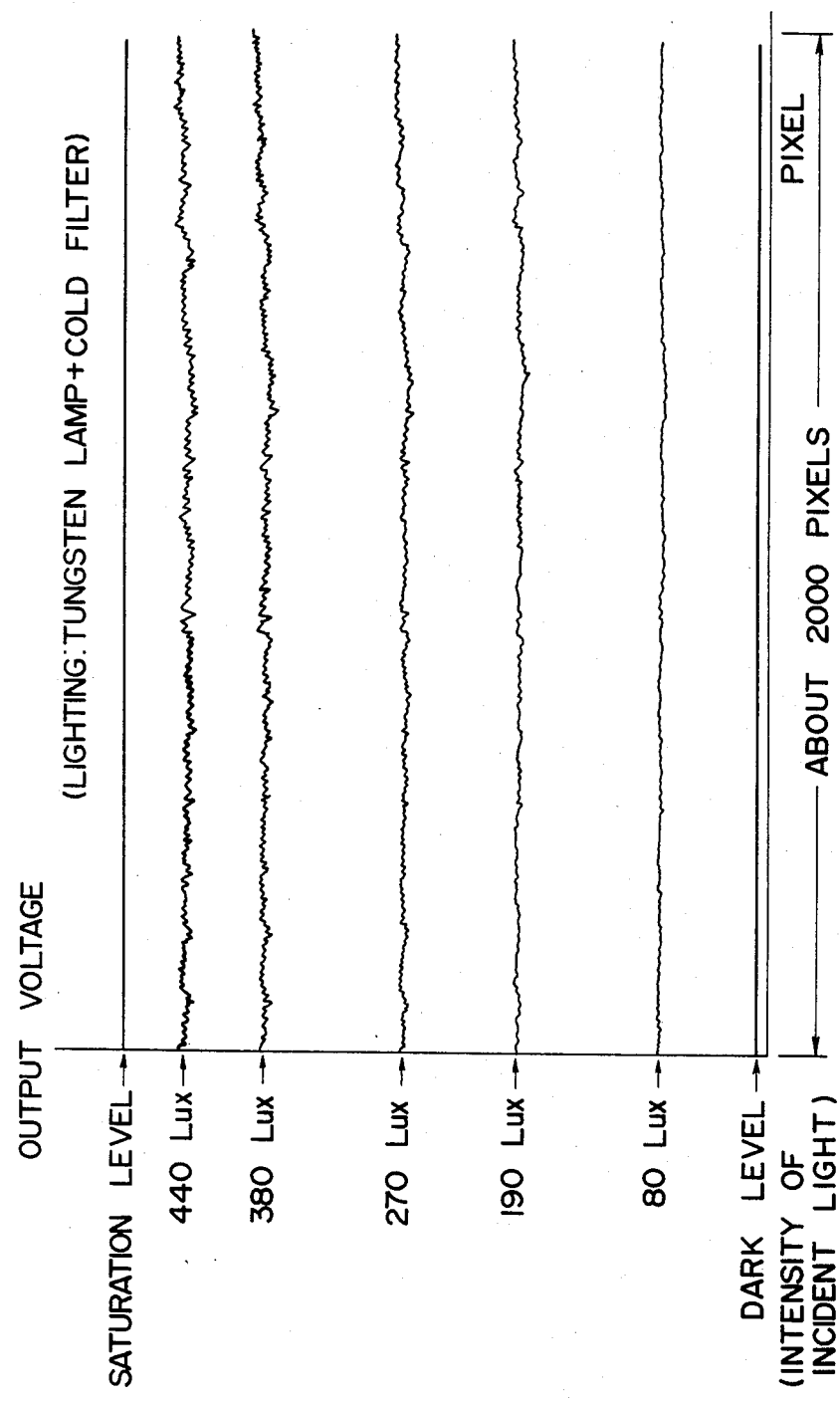
FIG. 1 is a graph showing variations in the sensitivity of a solid state image pickup device.

As will be understood from FIG. 1, the variation in the sensitivity of the CCD line sensor is about 3% of the signal level. Assuming that the maximum variation is 6.25%, the sensitivity variation at the output of the analog-to-digital converter 2 is still within the range of the low order four bits among the eight bits described above. Accordingly, as the digital memory 5, a ROM having a storage capacity of 4 bits × 1024 may be used. AS the multiplier 6, a circuit for four bits of input and four bits of output is used. The compensation value Y is stored in advance in the digital memory 5 in the manner described above.

In order to calculate $\Delta\alpha(n) \cdot A(n)$ in Equation (4) shown above, it is also sufficient to use only the value X of the high order four bits among the eight bits of digital output (video signal) that is obtained by the analog-to-digital conversion of the output from the solid state image pickup device 1. Therefore, the value X of these high order four bits is input to the multiplier 6, where it is multiplied by the compensation value Y. The output X×Y obtained from the multiplier 6 corresponds to $\Delta\alpha(n) \cdot A(n)$ in Equation (4). The obtained output X×Y is input to the subtracter 7, where it is subtracted from the value Z of the low order four bits in the aforesaid digital output. This subtraction corresponds to Z−X×Y, or $A(n) - \Delta\alpha(n) \cdot A(n)$ and, thus, completes the compensation for the sensitivity variations. The output from the subtracter 7 constitutes the ideal output B(n) involving no variation.

To accomplish this, the conventional method requires a ROM having a capacity of 8 bits × 1024 and a divider for eight bits of input and output. On the contrary, the output compensating system in the above-mentioned embodiment of the present invention requires a ROM having a capacity of only 4 bits × 1024, as well as a multiplier and a subtracter for only four bits of input and output. Therefore, the output compensating system of the present invention reduces the cost much below that of the conventional method.

In the first embodiment of the present invention described above, the value X of the high order four bits in the digital output is multiplied by the compensation value Y, and the obtained value X×Y is subtracted from the aforesaid digital output value. This operation is identical to subtracting the aforesaid value X a number of times corresponding to the compensation value Y (i.e. Y times) from the digital output value. Therefore, it is also possible to carry out the calculation of Equation (4) only with a subtracter without using a multiplier.

The second embodiment below shows how the output compensating system of the present invention can be accomplished using only a subtracter instead of a combination of a multiplier and a subtracter.

Figure 3:
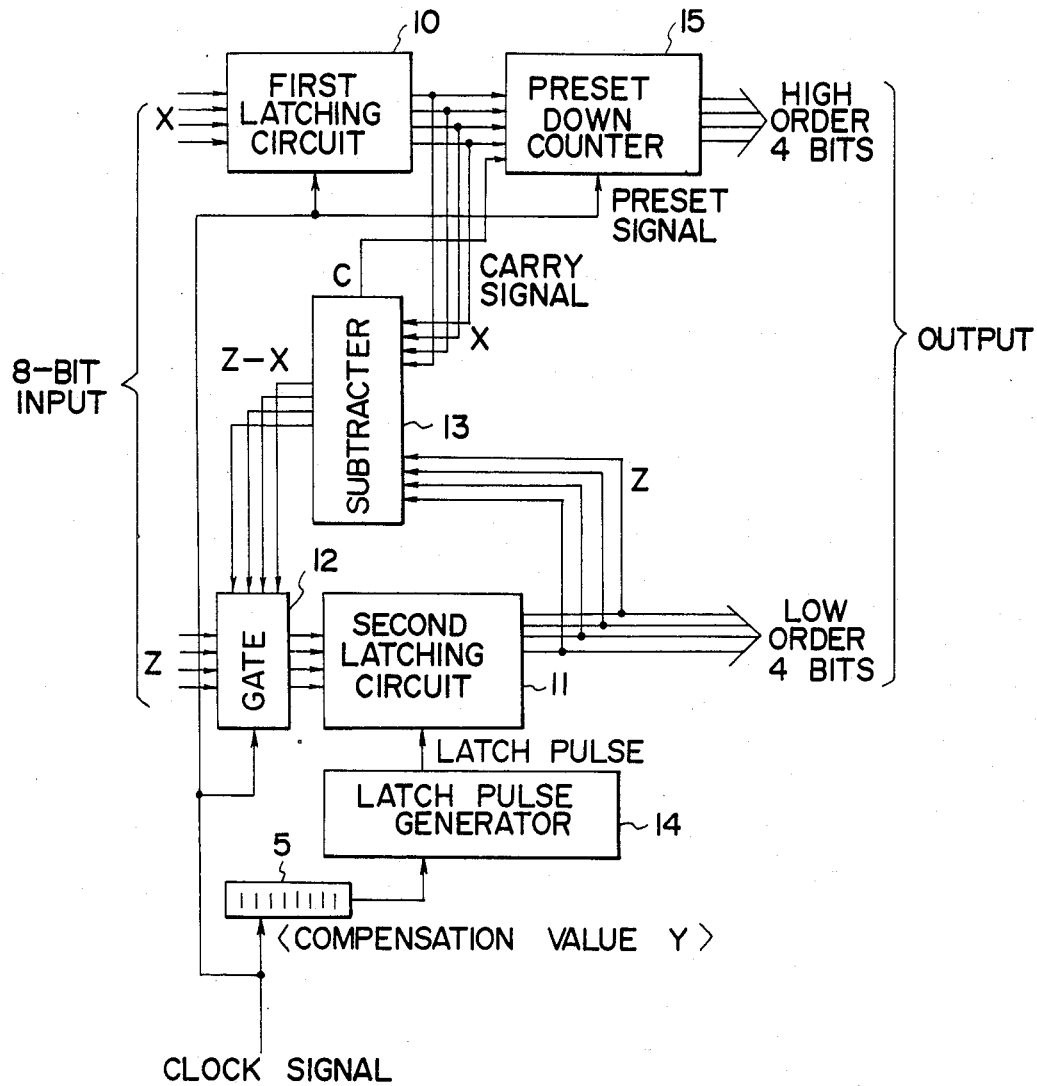
FIG. 3 is a block diagram showing an output compensating system according to the second embodiment of the present invention.

FIG. 3 is a block diagram showing the output compensating system according to the second embodiment of the present invention.

Eight bits of digital output (video signal), obtained through analog-to-digital conversion in an analog-to-digital converter (not shown) corresponding to converter 2 in FIG. 2, is divided into the value X of the high order four bits and the value Z of the low order four bits. The high-order 4-bit X and low-order 4-bit Z are stored in the first latching circuit 10 and the second latching circuit 11, respectively. The high-order 4-bit X is then stored in a preset down counter 15. When the low-order 4-bit Z of the video signal has been stored in the second latching circuit 11, a gate circuit 12 is switched to input the output signal of a subtracter 13 into the input terminal of the second latching circuit 11. At this point of time, the output signal of the subtracter 13 is being input to the input terminal of the second latching circuit 11, while the data of the low-order 4-bit Z of the video signal that was stored previously is being output from the output terminal of said second latching circuit 11. The data Z are input to the input terminal of the subtracter 13. To the other input terminal of the subtracter 13, the high-order 4-bit X of the video signal that was stored in the first latching circuit 10 is being supplied.

When a carry signal develops in the subtracter 13, the value stored in the preset down counter 15 is carried down by one bit.

Digital memory 5 is of the same type as the digital memory 5 used in the first embodiment described above and stores the compensation value Y therein in advance in the same way as the first embodiment. The memory 5 is connected with a latch pulse generator circuit 14, which generates the number of clock pulses corresponding to the compensation value Y and inputs them to the second latching circuit 11.

In the arrangement shown in FIG. 3, when "n" clock pulses are input to the second latching circuit 11, the output from the second latching circuit 11 is represented by the following equation:

$$B(n) = Bo - \overbrace{\frac{Ao}{16} - \frac{Ao}{16} \ldots}^{n} = Bo - \frac{Ao \times n}{16} \quad (5)$$

wherein B(n) denotes the output obtained from the second latching circuit 11 when "n" latch pulses are input thereto, i.e. the compensated low order four bits of the video signal; Bo denotes the low-order 4-bit Z of the video signal, which is originally input to the second latching circuit 11; Ao denotes the high-order 4-bit X of the video signal, which is stored in the first latching circuit 10; and 1/16 denotes the operation for equalizing the order of Ao to that of the low order four bits.

Thus Equation (5) is equivalent to $A(n) - \Delta \alpha(n) \cdot A(n)$ in Equation (4). Based on Equation (5), the latch pulse generator 14 generates the number of clock pulses that coincides with the compensation value (sensitivity variation value) read from the memory 5. The generated latch pulses are used to control the second latching circuit 11. In this way, the system of this second embodiment can compensate for the variations in the sensitivity of the solid state image pickup device without the necessity of using a multiplier.

In the embodiments described above, the sensitivity variation was assumed to be no more than 6.25% of the signal level, and four bits were used for the compensation amount. In case the variation in the sensitivity is within 0.39% of the signal level, only one bit need be used for the compensation amount. In this case, compensation is made through the subtraction of the signal of the most significant bit from the signal of the least significant bit. The system of the present invention for this compensation is constituted of a 1 bit × 1024 ROM and 1-bit subtracter, thereby providing a further reduction in the cost compared with the conventional method.

In addition, the output compensating system of the present invention has been explained, in the above described embodiments and example, as the system for compensating for the variations in the sensitivity of a solid state image pickup device. However, it should be understood that the system of the present invention can compensate for any outputs issued from any types of devices when such outputs comprise a plurality of components showing relatively small variations that are proportional to the magnitude of inputs. For example, the present invention can also compensate for variations caused by the reflecting planes of a polygonal mirror in a laser beam scanning system.

We claim:

1. A system for compensating for variation in an output for each of a plurality of components in which said output has relatively small variations proportional to the magnitude of inputs, comprising a memory means for storing a compensation value (B) predetermined for each component with reference to a given unit level of output on the basis of the variation among said components, an analog-to-digital conversion means for converting said output into several bits of digital output, a multiplication means for multiplying the value (A) of the high order bits of said digital output by the compensation value (B) stored in said memory means, and a subtraction means for subtracting the output (A×B) of said multiplication means from the value (C) of the low order bits of said digital output and outputting a compensating signal.

2. A system for compensating for variation in an output for each of a plurality of components in which the said output has relatively small variations proportional to the magnitude of inputs, comprising a memory means for storing a compensation value (B) predetermined for each component with reference to a given unit level of output on the basis of the variation among said components, an analog-to-digital conversion means for converting said output into several bits of digital output, means for lowering the order of the value (A) of the high order bits of said digital output to coincide with the order of the value (C) of the lower order bits of said digital output, a subtraction means which subtracts the value (A) of high order bits a number of times, as determined by said compensation value B, from the value (C) of the low order bits, and means for outputting a compensated signal.

* * * * *